US005146555A

United States Patent [19]

Kiyohara

[11] Patent Number: 5,146,555

[45] Date of Patent: Sep. 8, 1992

[54] HIGH SPEED PAGE TURNING CONTROL SYSTEM AND METHOD WITH DISPLAY WINDOW COMPRESSION

[75] Inventor: Toshimi Kiyohara, Nara, Japan

[73] Assignee: Sharp Kabushiki Kaisha, Osaka, Japan

[21] Appl. No.: 221,350

[22] Filed: Jul. 19, 1988

[30] Foreign Application Priority Data

Jul. 22, 1987 [JP] Japan ............ 62-184059

[51] Int. Cl.[5] ............ G06F 3/14; G06F 15/62; G09G 5/14

[52] U.S. Cl. ............ 395/157; 395/135; 395/144; 395/161; 340/721; 340/724; 340/723

[58] Field of Search ............ 364/521, 518; 340/723, 340/724, 731, 750, 798, 799, 721; 395/157, 158, 161, 135, 144, 145, 148

[56] References Cited

U.S. PATENT DOCUMENTS

| | | | |
|---|---|---|---|
| 4,559,533 | 12/1985 | Bass et al. | 340/724 |
| 4,670,752 | 6/1987 | Marcoux | 340/721 |
| 4,757,302 | 7/1988 | Hatakeyama et al. | 340/407 |
| 4,808,987 | 2/1989 | Takeda et al. | 340/721 |
| 4,829,453 | 5/1989 | Katsuta et al. | 364/521 |

OTHER PUBLICATIONS

*IBM Technical Disclosure Bulletin,* vol. 28, No. 12, dated May 1986, pp. 5318 and 5319.

*Primary Examiner*—Gary V. Harkcom
*Assistant Examiner*—Raymond J. Bayerl

[57] ABSTRACT

A high speed page turning control system and method which is capable of representing the page turning process by actively displaying the image of a compressed window on a display, for example a CRT. A first page is displayed on a display, a second page is overlapped with the first page. The first page, is compressed and the image on the second page comes into further view until only the second page is displayed on the display. To do a previous page the display is effected in reverse order.

6 Claims, 5 Drawing Sheets

HIGH SPEED PAGE TURNING CONTROL SYSTEM AND METHOD WITH DISPLAY WINDOW COMPRESSION

BACKGROUND OF THE INVENTION

The present invention generally relates to an image display system and more particularly, to a high speed page turning control system based on a hardware window type.

Conventionally, there have been proposed image display control systems, for example, as shown in FIG. 5(*a*), 5(*b*) and 5 (*c*).

The control system based on a raster operation as shown in FIG. 5(*a*) is of a software window type. The control system is arranged so that each image information of windows A, B and C stored in a window memory 1 is once subjected to block transfer to a display memory 2, on which editing of the image surface such as positioning, overlapping, etc. for the respective windows A, B and C is effected, and thereafter, the image information is successively read out from the display memory 2 for displaying multi-windows on a CRT (cathode ray tube) 3.

In the arrangement based on a mapping table system of FIG. 5(*b*), each image information of windows A, B and C is stored in a window memory 4 and the address of the image information corresponding to the scanning position of a CRT 6 is outputted during scanning of the CRT 6 through successive change-over from a mapping table 5 in the form of a hardware, whereby the image information from the window memory 4 is read by time division according to said address so as to display the multi-windows directly on the CRT 6 without passing through any other memory.

Meanwhile, the control system based on clipping, as shown in FIG. 5(*c*), is of a software window type so arranged that code data representing the image information for the windows A, B and C as stored in a segment buffer 7 is displayed on a display memory 8, with the code data of the image information outside the windows being removed by clipping, and thus, the image information is successively read out from the display memory 8 for displaying multi-windows on the CRT 9.

However, the conventional image display control systems in FIG. 5(*a*), 5(*b*) and 5(*c*) as referred to above respectively have problems, as described hereinafter, in the case where the process for turning pages is to be actively represented by effecting compression display of the windows.

More specifically, in the control system by the raster operation of FIG. 5 (*a*), since the image information of the window memory 1 is once subjected to block transfer onto the display memory 2 for editing the image surface on said display memory 2 so as to be subsequently displayed on the CRT 3, in the case where the page turning for compression display of the windows is to be realized, it is necessary to excute the function for the block transfer while thinning-out the image information in the window region, each time when the windows are compressed, and thus, it is difficult to effect a high speed and active page turning.

Meanwhile, in the control system by the mapping table of FIG. 5(*b*), since the address on the window memory 4 is successively outputted through change-over from the mapping table 5 and the image information stored in this address is directly displayed on the CRT 6 by time division, it is possible to display the page at any desired position on the CRT 6 at high speeds. However, the above function is nothing but a mere page change-over display as it is, and active page turning can not be represented thereby. More specifically, in the case where the image of compressed windows is to be displayed actively, alteration of parameters showing the window regions following the compression must by effected per each frame refreshing (to display 30 to 70 images per second).

In the control system by the clipping in FIG. 5(*c*), owing to the arrangement that the code data representing the image information of the segment buffer 7 is drawn on the display memory 8, with the code data for the unnecessary image information being removed by clipping for subsequent display on the CRT 9, in the case where the page turning by compresed display of windows is to be realized on the CRT 9, it is required to provide a hardware to compress the code data of the segment buffer of for drawing thereof on the display memory 8 at high speeds.

SUMMARY OF THE INVENTION

Accordingly, an essential object of the present invention is to provide a high speed page turning control system which is capable of representing the page turning process by actively displaying the image of compressed windows through alternation of parameters showing the window regions following the window compression per each frame refreshing by utilizing the high speed characteristic which is the advantage in the hardware window system based on the mapping table.

Another object of the present invention is to provide a high speed page turning control system of the above described type, which is simple in construction and accurate in functioning at high reliability.

In accomplishing these and other objects, according to one preferred embodiment of the present invention, there is provided a high speed page turning control system which includes a window buffer memory for storing image information such as sentences, drawings, tables, etc. to be displayed on a display device, a display priority order setting means for setting priority order of display, during display of a rectangular region for turning page and that for stationary page on said display device, a turning amount calculating means for successively calculating size of the rectangular region of the turning page to be displayed on said display device, a thinning-out amount calculating means for successively calculating the thinning-out amount of the image information for the turning page according to the size of the rectangular region as calculated by said turning amount calculating means, and a controller for directly displaying the images for the turning page and stationary page on the display device successively, by controlling reading position of the image information for the turning page and that for the stationary page stored in said window buffer memory, according to the display priority order set by said display priority order setting means, the size of the rectangular region for the turning page as calculated by said turning amount calculating means, and the thinning-out amount for the turning page image information as calculated by said thinning-out amount calculating means.

In the above arrangement, the size of the rectangular region of the turning page to be displayed on the display device is successively calculated by the turning amount calculating means, and the thinning-out amount of the image information for the turning page is also successively calculated according to the size of the rectangular region as calculated by the turning amount calculating means. Then, according to the display priority order set by said display priority order setting means, the size of the rectangular region for the turning page as calculated by said turning amount calculating means, and the thinning-out amount for the turning page image information as calculated by said thinning-out amount calculating means, the reading position of the image information for the turning page and that for the stationary page stored in said window buffer memory are successively controlled by the controller to read out the image information, and the images for the turning page and stationary page are directly displayed on the display device successively. Accordingly, the image in which the rectangular region of the turning page is compressed may be displayed actively.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
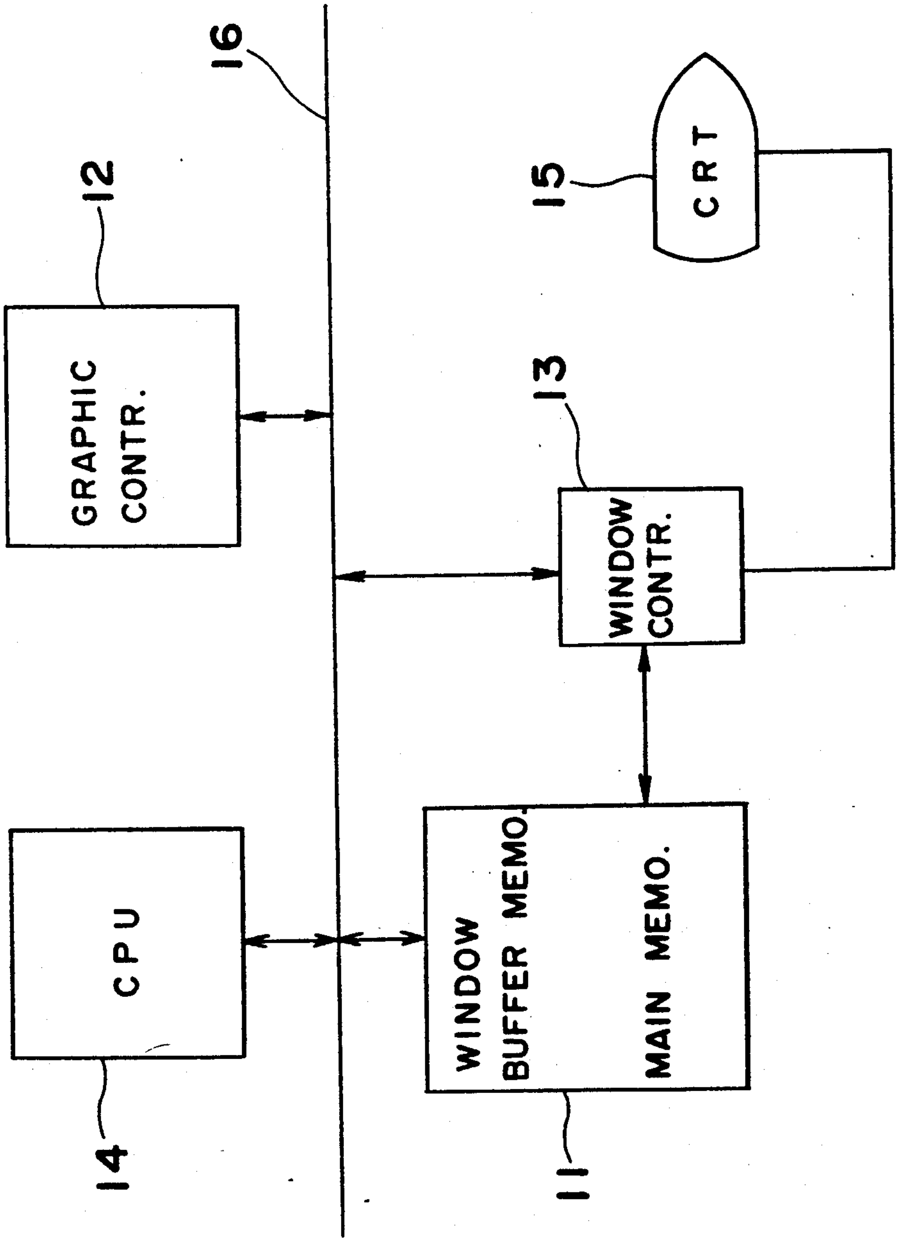
FIG. 1 is a block diagram showing general construction of a high speed page turning control system according to one preferred embodiment of the present invention, FIGS. 2(*a*), 2(*b*), 2(*c*), 2(*d*) and 2(*e*) are diagrams for explaining page turning function in the control system of FIG. 1, as particularly represented in Japanese for better understanding and clarity of explanation.

Before the description of the present invention proceeds, it is to be noted that like parts are designated by like reference numerals throughout the accompanying drawings.

Referring now to the drawings, there is shown in a block diagram of FIG. 1, showing the general construction of a high speed page turning control system according to one preferred embodiment of the present invention, which includes a window buffer memory 11 commonly serving as a main memory and coupled with the CPU (central processing unit) 14 and a graphic controller 12 through a bus line 16, and also to a CRT (cathode ray tube) 15 through a window controller 13 as shown.

The window buffer memory 11 is a memory for storing image information such as sentences, drawings, tables, etc., and also serves as the main memory in the present embodiment for achieving efficient utilization of the memory. In this case, although there is a disadvantage that access of the CPU 14 to the main memory is required to wait during access from the graphic controller 12 to the window buffer memory 11, it becomes possible to effectively utilize the window buffer memory 11 whose capacity is increased with the increase of the information capacity of the image to be displayed. The graphic controller 12 effects the graphic drawing, etc. to the window buffer memory 11 through the bus line 16.

The window controller 13 is a controller for displaying the contents of the window buffer memory 11 directly onto the CRT 15 without passing through any other memory, by controlling the image information reading address of the window buffer memory 11 in order to realizē a real page turning. Such control of the reading address, etc. may be effected by writing parameters related to the display, into a register in the window controller 13.

Hereinbelow, the page turning function will be described with reference to FIGS. 2(*a*) to 2(*e*).

It is to be noted here that for clarify of explanation and better understanding, Japanese sentences are particularly shown as they are in FIGS. 2(*a*) to 2(*e*). The English translation of the whole Japanese sentences is given just for reference as follows, with FIGS. 2(*b*) to 2(*d*) showing part of said Japanese sentences as appearing on the CRT 15.

Figure 2A:
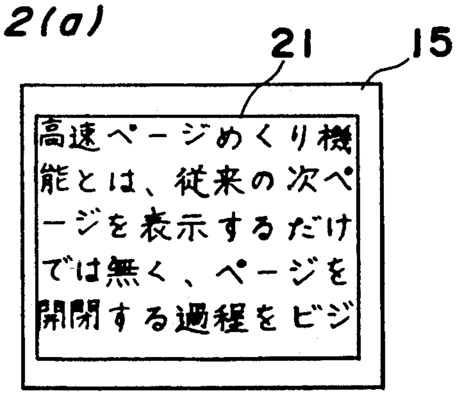
Figure 2B:
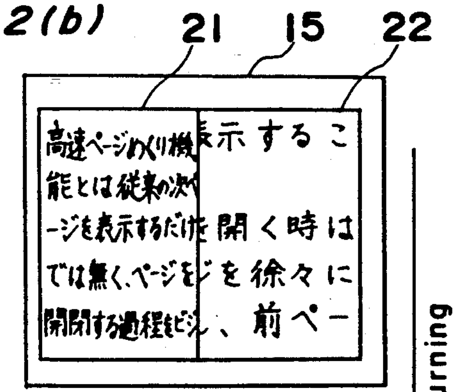
Figure 2B:
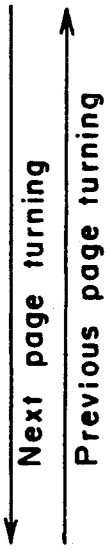
Figure 2C:
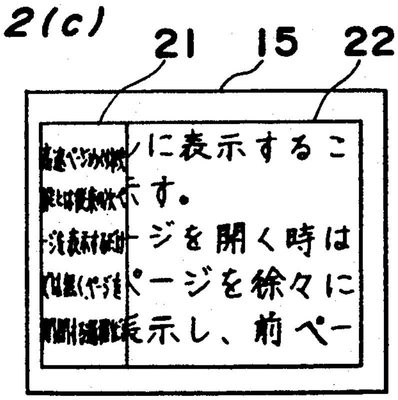
Figure 2D:
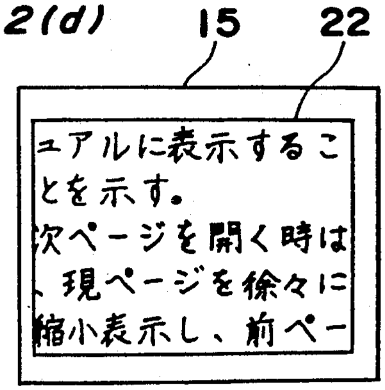
Figure 2E:
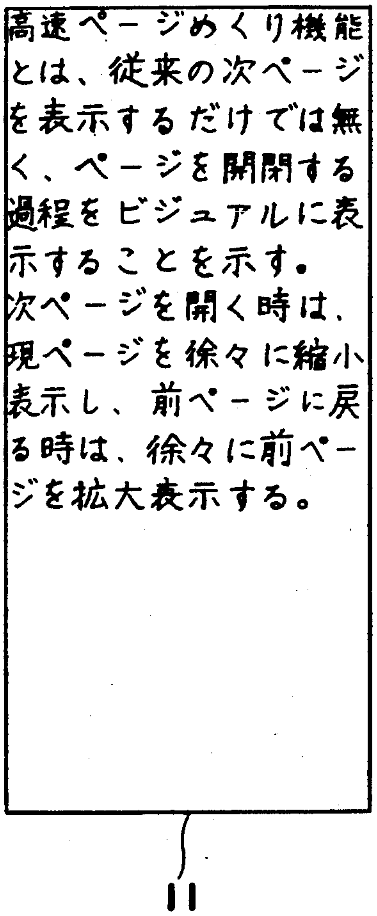

| FIG. 2(e) (English translation) |
|---|
| High speed page turning<br>function indicates not<br>only to display the next<br>page as in the known<br>practice, but to visually<br>display the process for<br>opening or closing pages.<br>For opening the next<br>page, the present<br>page is gradually<br>contracted for display,<br>while for returning to<br>the previous page,<br>it is gradually enlarged<br>for display. |

Now, it is assumed that, in the window buffer memory 11, image information for sentences " . . . " (High speed page . . . pages. For opening . . . for display.) as shown in FIG. 2(*e*) is stored, and on the CRT 15, a first page 21 (the sentence " . . . ") is displayed as shown in FIG. 2(*a*) based on the image information within the window buffer memory 11.

In the above case, the term "active page turning" indicates the display function as follows. Specifically, windows of the same size, i.e. the window for displaying the first page 21 and the window for displaying second page 22 are overlapped, and the size of the window for the turning page in the horizontal direction is altered so as to display therein the image of the turning page as compressed. In other words, in the case of the next page turning, as the window for the first page 21 in FIG. 2(*a*) is compressed leftwards in the drawing i.e. the window of the first page 21 is narrowed in its width, and the image information for the first page 21 as thinned-out is displayed in said narrowed window), part of the right side for the second page 22 (i.e. the sentence " . . . ") comes to be seen in the next window as shown in FIGS. 2(*b*) and 2(*c*), and finally, only the second page 22 becomes visible as shown in FIG. 2(*d*). Meanwhile, in the case of the previous page turning, the display is effected in the reverse order to the above as in FIG. 2(*d*) to FIG. 2(*a*), in the manner as if the pages were actually turned on the CRT 15.

Figure 3:
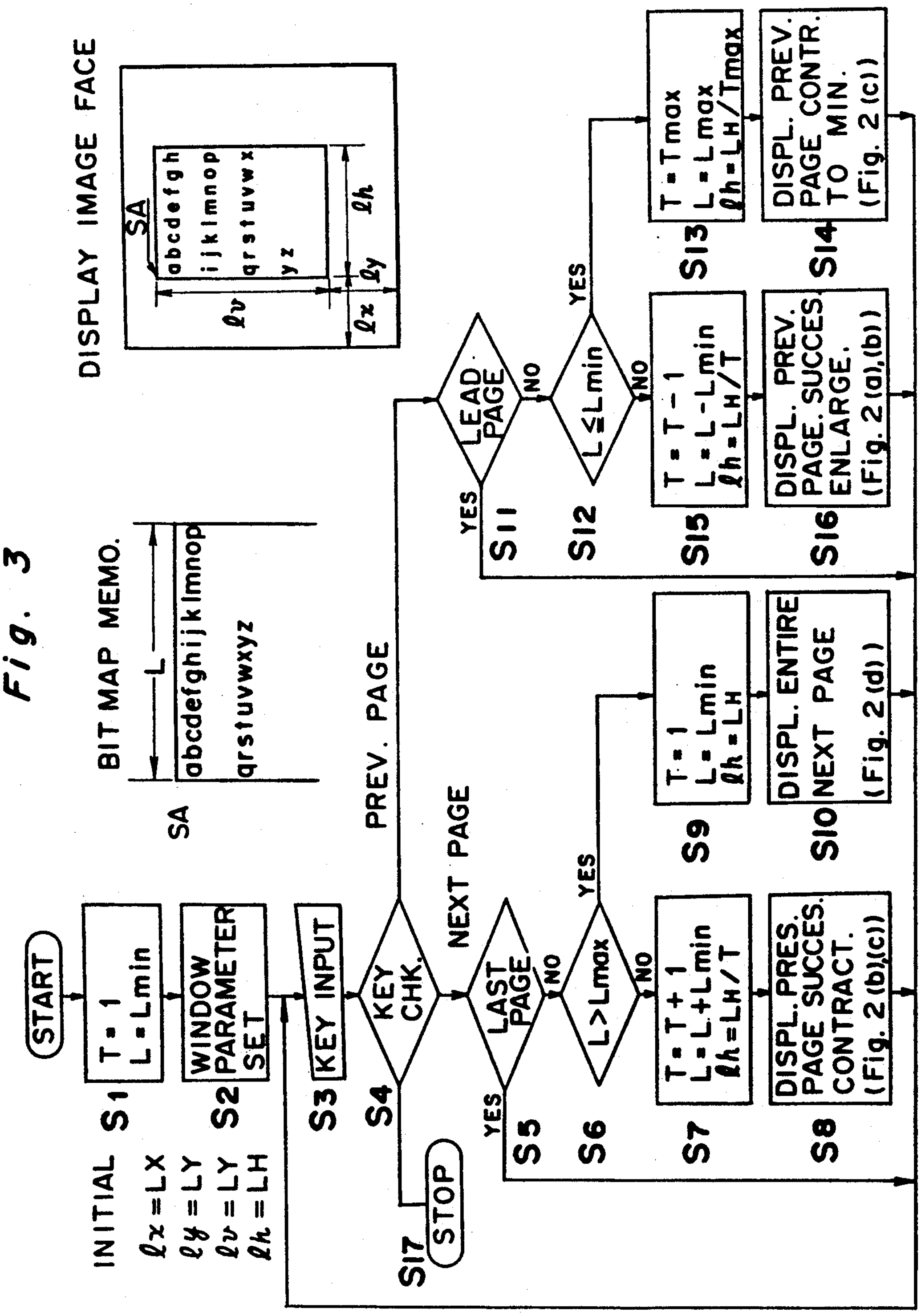
FIG. 3 is a flow-chart for explaining the page turning control routine in the control system of FIG. 1.

FIG. 3 shows a flow-chart for the page turning control routine of a document. Subsequently, the page turning control function according to the present invention will be described hereinbelow with reference to FIGS. 2 and 3.

In FIG. 3, symbols lx, ly, lv and lh represent parameters for designating regions of the window, while a symbol L denotes a width of an image surface on the window buffer memory 11. Here, by obtaining an integer multiple of L, the data of the window buffer memory 11 may be thinned out in the horizontal direction on the image surface of the CRT 15. Symbols L min and L max are the minimum and maximum values of the image surface width L on the above memory, and determined by the hardware of the window processor respectively, while a symbol T is a contraction ratio. It is also assumed that the display priority order for the window with a smaller number of pages is set to be high by a display priority order setting means.

At step S1, initial values are set at T1=1 and L=L min.

At step S2, initial values for the window parameters are set (lx=LX, ly=LY, lh=LH).

At step S3, key input for the page turning function designation is effected.

At step S4, check for the key inputted at above step S3 is made. As a result, if the designated page turning function is of a next page turning function, the procedure proceeds to step S5, while on the contrary, if it is of a previous page turning function, the procedure proceeds to step S11, and if it is of a page turning stopping, the procedure proceeds to step S17 to complete the control routine.

At step S5, it is judged whether or not the page displayed on the CRT 15 is of a last page. As a result of the judgement, if the page is of the last page, the procedure is returned to step S3 on the assumption that the next page turning function has been completed. If the page is not of the last page, the procedure proceeds to step S6.

At Step S6, it is checked whether or not L is larger than L max. As a result, if L is larger than L max, the procedure proceeds to step S9 to effect the entire next page display, and if L is not larger than L max, the procedure proceeds to Step S7 for the next page turning display.

At step S7, calculations for $T=T+1$ (=2), $L=L+L$ *min* (=2 L min), and lh=LH/T (=LH/2) are effected. Results for the first calculations are given in parentheses.

At step S8, based on L and lh as calculated at step S7, the first page as shown in FIG. 2(*a*) is contracted to $\frac{1}{2}$, and as shown in FIG. 2(*b*), the image in which the first page 21 is half turned, is displayed in the manner as described below, and thus, the step is returned to step S3.

Specifically, the value LH of the window parameter lh for the turning page stored in the register for the turning page (here, the first page 21) within the window controller 13 in FIG. 1 is replaced by LH/2 as calculated at the above step S7. Meanwhile, the window controller 13 is arranged to access by thinning out every other address of the image information for the turning page within the window buffer memory 11. In this case, the window parameter lh in the register for the stationary page here, the second page 22) of the window controller 13 remains to be LH Accordingly, at the portion 21 on the CRT 15 where the turning page window and the stationary page window are adjacent to each other (i.e. the left half portion on the image surface), the image information for the first page with the higher display priority order is read out as being thinned out at every other portion in the horizontal direction on the image surface of the CRT 15 through control by the window controller 13, so as to be directly displayed on the CRT 15 without passing through any other memory, whereby the image for the first page contracted to $\frac{1}{2}$ in the horizontal direction, is displayed thereon. Meanwhile, on the window 22 only for the stationary page (at the right side half on the image surface), in the image for the second page which is not contracted, only the portion not overlapped with the image of the first page is displayed. As a result, the state where the turning page is turned only by half is displayed.

Subsequently, steps S3 to S8 are repeated until the relation becomes L>L max. Here, one example of display when T=4, L=4, L min and lh=LH/4 are obtained through calculation at step S7, is shown in FIG. 2(*c*). In this case, the state where the turning page is turned by $\frac{3}{4}$ is shown.

At step S9, T=1, L=L min, and lh=LH are respectively set.

At step S10, as shown in FIG. 2(*d*), only the next page (the second page 22) is displayed on the entire surface of the window, and the next page turning function equivalent to one page is completed.

Meanwhile, in the case of the previous page turning, the function is effected as follows.

At step S11, it is checked whether or not the page as displayed on the CRT 15 at present is of a leading page at the head. if it is of a leading page, the procedure returns to step S3 on the assumption that the previous page turning function has been completed, while on the contrary, if it is not of a leading page, the procedure proceeds to step S12.

At step S12, it is checked whether or not L is smaller than L min, and if it is smaller than L min, the procedure proceeds to step S13 to effect the previous page minimum display, while if it is not smaller than L min, the step proceeds to step S15 to effect the previous page turning display.

At step S13, T=T max, L=L max and lh=LH/T max are set.

At step S14, in the manner as described above, the turning page [here, the first page 21) as compressed to the minimum window width is displayed on the window for the turning page, and in the other window, the uncompressed image of the stationary page (here, the second page 22) is partially displayed (FIG. 2(*c*)).

At step S15, calculations for $T=T-1$, $L=L-L$ *min*, and lh=LH/T are effected.

At step S16, based on the L and lh as calculated at step S14, the image in which the turning page is further turned as described above is displayed, and then, the procedure returns to step S3.

Subsequently, steps S3 to S16 are repeated, and the images in which the turning page (previous page) is successively enlarged are displayed as shown in FIGS. 2(*b*) and 2(*a*). Thus, when the results of calculations at the above step S15 are T=1, L=L min, and lh=LH, only the previous page is displayed on the entire surface of the window as shown in FIG. 2(*a*), and thus, the previous page turning function equivalent to one page is completed.

In short, in the high speed page turning control system of the present invention as described so far, it is so arranged that in the display priority order for the overlapping between the turning page window and the stationary page window, the turning page window is preliminarily set higher, and then, the size of the window for displaying the turning page and the thinning-out amount of the page information of the turning page corresponding to the contraction ratio of the window are successively calculated, and based on the result of this calculation, the reading address of the image information of the window buffer memory 11 is controlled by the window controller for reading out the image information. Thus, at the portion where the turning page window and the stationary page window are overlapped, the image of the turning page compressed according to the size of the contracted window for the turning page with the higher display priority order is displayed, while in the other portion, only one portion of the uncompressed stationary page is displayed.

Accordingly, by the high speed page turning control system according to the present invention as described so far, it is possible to represent the process of page turning in real time by the image. Moreover, by this control system, a high speed page turning may be executed based on the hardware window system arranged to display the image information with the window buffer memory as read out through access by the control of the window controller, directly on the CRT 15 without passing through any other memory.

Figure 4:
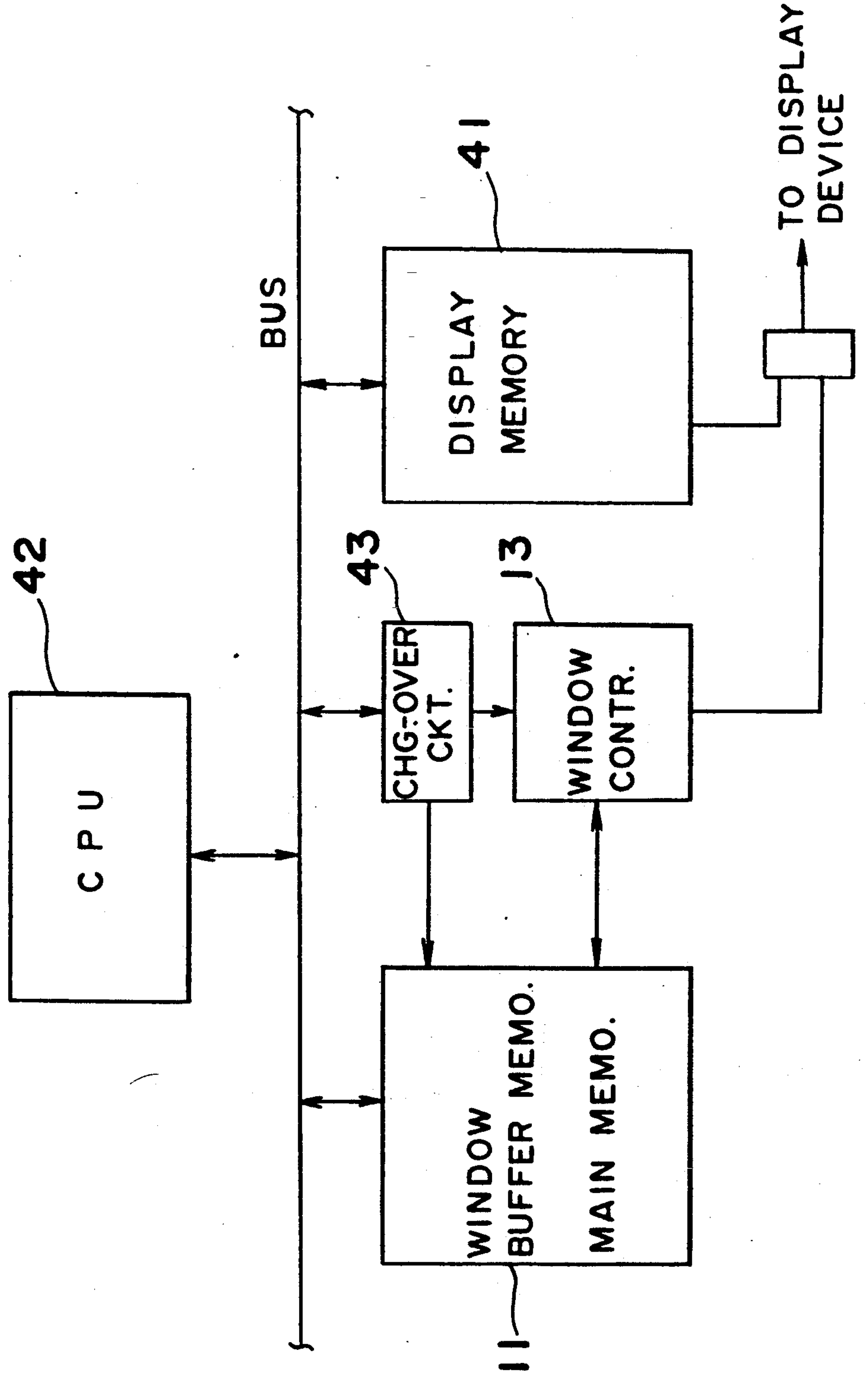
FIG. 4 is a block diagram similar to that of FIG. 1, which particularly shows a second embodiment thereof, and FIG. 5(*a*), 5(*b*) and 5(*c*) are diagrams for explaining conventional image display control systems described above.
Figure 5:
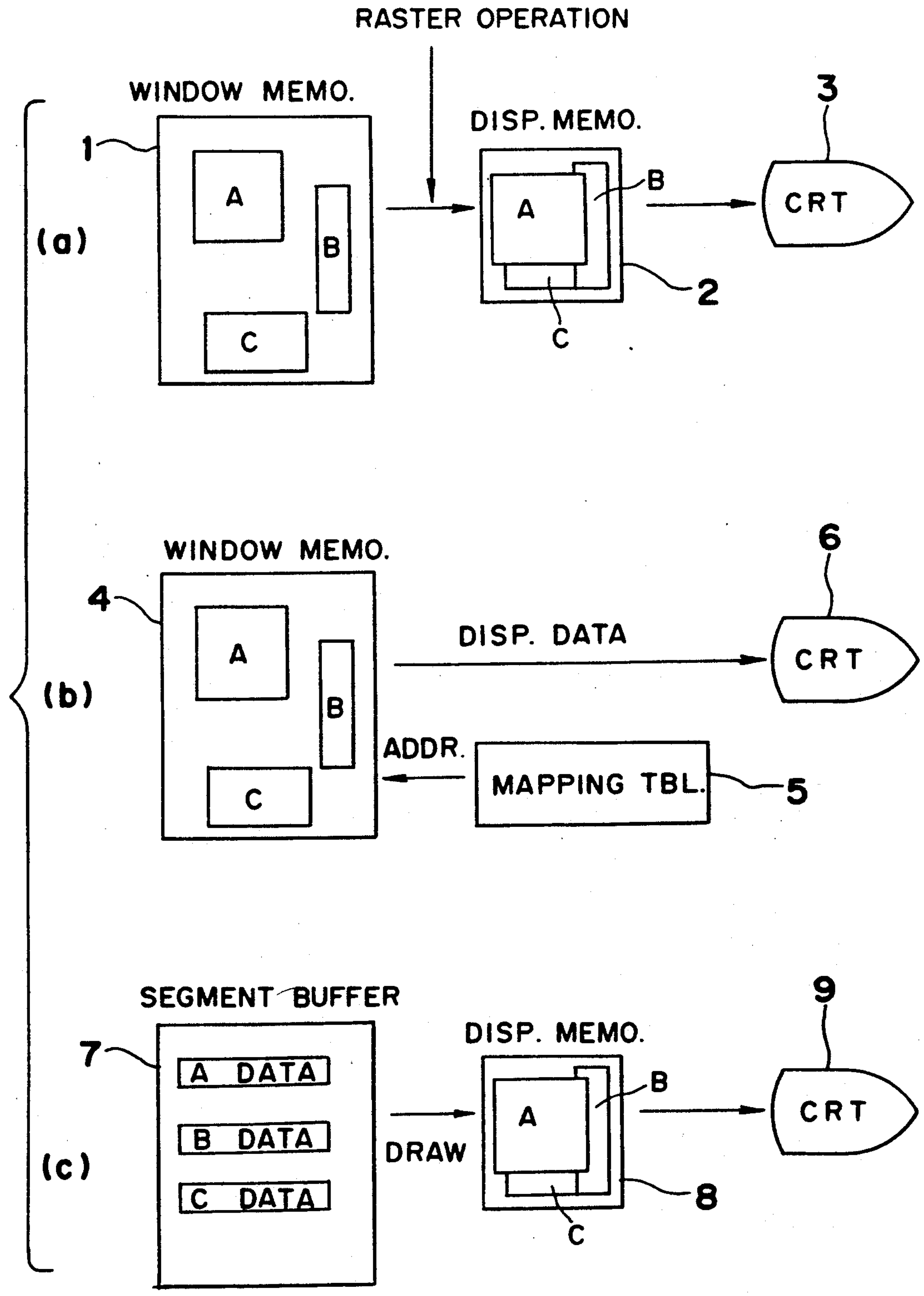
Fig. 5 PRIOR ART

In FIG. 4, there is shown a block diagram for a high speed page turning control system according to a second embodiment of the present invention, which includes a window buffer memory 11 coupled with a CPU 42 through a bus line, a change-over circuit 43 inserted between the window buffer memory 11 and the bus line, and connected to a window controller 13 coupled with the window buffer memory 11 which is further connected to the display device, and a display memory 41 inserted between the bus line and the display device as illustrated.

The display memory 41 is a two-port display memory i.e. a bit map memory for display having memory elements each corresponding to picture elements on the display device, and the change-over circuit 43 is arranged to effect selection through change-over between the display mode for displaying the contents of the window buffer memory 11 on the display device, and the drawing mode which does not display the contents thereof on said display device. Through changing-over by the change-over circuit 43, it is possible to effect the change-over between the high speed data transfer between the window buffer memory 11 and the two-port display 41, and the direct display of the contents of the window buffer memory 11. Meanwhile, it is so arranged to execute by the CPU 42, without employing the graphic controller as in the first embodiment, such function as the transfer of the image data between the window buffer memory 11 and the two-port display memory 41 or graphic drawing to the window buffer memory 11 or to the two-port display memory 41.

As is clear from the foregoing description, in the high speed page turning control system of the present invention, it is so arranged that according to the display priority order set by said display priority order setting means, the size of the rectangular region for the turning page as calculated by said turning amount calculating means, and the thinning-out amount for the turning page image information as calculated by said thinning-out amount calculating means, the reading position of the image information for the turning page and that for the stationary page stored in said window buffer memory are successively controlled by the controller to read out the image information, and the images for the turning page and stationary page are directly displayed on the display device successively.

Therefore, instead of merely displaying the next page or previous page through change-over, the process for turning the pages can be displayed actively and at high speed by images Although the present invention has been fully described by way of example white reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A high speed page turning control system which comprises:

a window buffer memory for storing image information such as sentences, drawings, tables, etc. to be displayed on a display device;

display priority order setting means for setting priority order of display, between a rectangular region for a turning page and that for a stationary page on said display device;

turning amount calculation means for successively calculating the size of the rectangular region of the turning page to be displayed on said display device;

thinning-out amount calculating means for successively calculating the thinning-out amount of the image information for the turning page according to the size of the rectangular region as calculated by said turning amount calculating means; and a controller for directly displaying the images for the turning page and stationary page on the display device successively, by controlling reading position of the image information for the turning page and that for the stationary page stored in said window buffer memory, according to the display priority order set by said display priority order setting means, the size of the rectangular region for the turning page as calculated by said turning amount calculating means, and the thinning-out amount for the turning page image information as calculated by said thinning-out amount calculating means.

2. A high speed page turning control system as defined in claim 1 wherein said controller overlaps the compressed image of a turning page onto the full size stationary image of a page on the display.

3. The high speed page turning control system device of claim 2 wherein said controller varies the compression of said turning page according to the amount of page turning.

4. The method of turning pages at high speed on an image display system comprising the steps of:

a) storing image information in a window buffer memory;

b) establishing the priority for the display for rectangular regions for the turning page and that for a stationary page;

c) calculating the size of a rectangular region of the turning page to be displayed on the image display;

d) thinning out the amount of image information for the turning page according to the size of the rectangular region as performed in step c); and controlling for directly displaying the images on the turning page and a stationary page on a display device successively by controlling the reading position of the image information for the turning page and that for the stationary page stored in the buffer memory, according to the steps of b), c) and d).

5. The method of claim 4 wherein the controlling overlaps the compressed image of the turning page onto the full page of a stationary image.

6. The method of claim 5 wherein the controlling varies the rate of compression according the amount of page turning.

* * * * *